Oct. 15, 1963   R. W. FREDERICKS   3,107,156
WATER TREATMENT APPARATUS
Filed Sept. 28, 1959

INVENTOR.
ROBERT W. FREDERICKS
BY
ATTORNEY 3,107,156
WATER TREATMENT APPARATUS
Robert W. Fredericks, Bell Gardens, Calif., assignor to Erlen Products Company, Burbank, Calif., a corporation of California
Filed Sept. 28, 1959, Ser. No. 842,664
6 Claims. (Cl. 23—267)

This invention relates to improvements in water treatment apparatus and has for one of its principal objects the provision of a device of the class described which will enable the efficient and practically automatic feeding of dry chemicals into the water systems of atmospheric cooling towers, induced draft cooling towers, boilers, evaporative condensers, heat exchangers, engine jacket cooling equipment and similar apparatus.

One of the important objects of this invention is to prevent the formation and undesirable accumulation of certain minerals which are always present in natural water supplies and which tend to form scale or corrosion.

Another object of the invention is to provide a briquette self-feeder for chemical treatment of water which will remove existing incrustations in such systems.

Another and still further object of the invention is to provide an apparatus and related equipment which will inhibit the growth of bacterial organisms, such as algae and slimes, and which dissolve various oxides of iron and maintain such oxides in the aqueous solution.

Yet another object of the invention is to provide, in a water treatment apparatus, means for retaining the necessary chemicals in a dry state until the actual time of use, wherein much better results are obtained.

Other and further important objects of the invention will be apparent from the disclosures in the accompanying drawings and following specification.

The invention, in a preferred form, is illustrated in the drawings and hereinafter more fully described.

Figure 1:
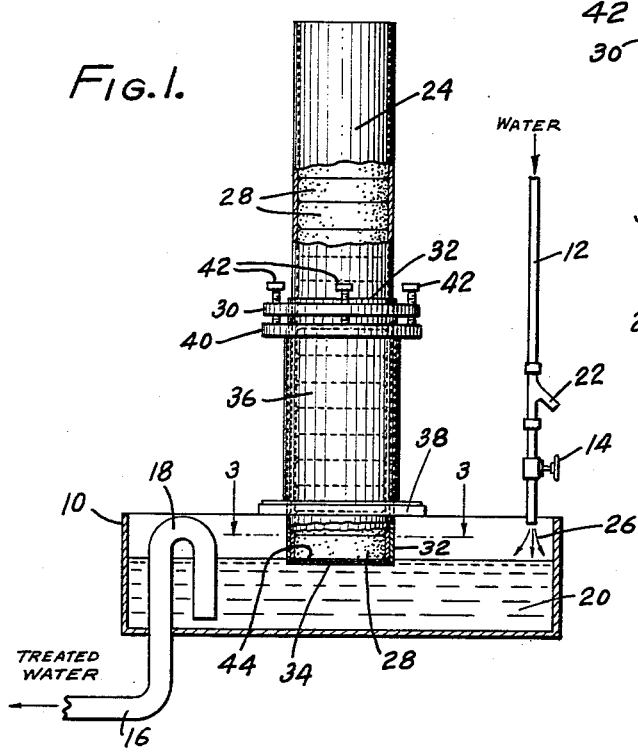
FIGURE 1 is an elevational view, partly in section and parts broken away, of the feeding device which comprises the essential portion of the water treatment apparatus of this invention.

The reference numeral 10 indicates generally a basin, pan, tank or container for an amount of water which forms part of the circulatory system treated in accordance with the method of this invention.

A pipe or inlet conduit 12, having a control valve 14, leads into the tank 10 for supplying a pre-determined amount of water, usually in a continuous operation, and an exit pipe or outlet conduit 16 which includes a siphon 18, as shown in FIGURE 1, leads out of the tank 10, and the relationship of this exit pipe to the tank is such that water 20 in the container 10 is always maintained at a pre-determined level, as shown.

The incoming water is screened by element 22, and the pipe 12 has a diameter less than half of the diameter of the siphon tube or pipe 16—18 so that when the water enters the reservoir 10, its level will rise to contact the end of a tube 24 which extends into the reservoir 10, as shown in FIGURE 1. The water will continue to rise in the container 10 until such time as the siphon 18 is primed, whereupon the greater diameter of the pipe 16 will act to empty the reservoir 10. When the water level falls to such an extent that the end of the siphon 18 is open to the air, the suction is broken and the siphon loses its prime, ceasing to act. Thereupon, the incoming water, as shown by the arrows 26 in FIGURE 1, will cause the water level 20 to again rise, whereupon the action is repeated. Adjustment of valve 14 increases or decreases the flow of water into the reservoir 10, whereby a carefully regulated control of the above described action is effected.

The tube 24 contains a quantity of briquettes 28, and each tube is preliminarily filled by the manufacturer with a desired or requisite number of briquettes of varying chemical compositions and which are arranged sequentially in order to provide a desired chemical balance in the entire system.

Figure 2:
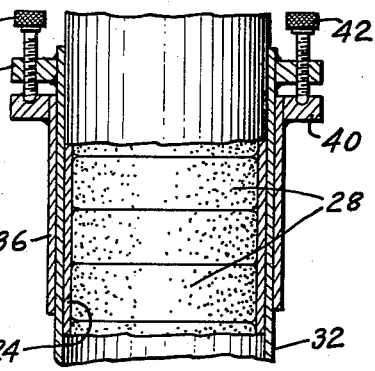
FIGURE 2 is an enlarged view, also partly in section and partly broken away, of the portion of the structure illustrated in FIGURE 1.
Figure 3:
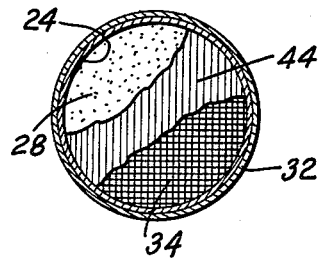
FIGURE 3 is an enlarged section, taken on the plane of the line 3—3 of FIGURE 1, looking in the direction indicated by the arrows, and illustrating a certain assemblage of cooperating indispensable elements.

The tube 24 is fitted into a holder which comprises an annulus 30 and a secondary tube 32 (FIGURES 1 and 2). This secondary tube 32 extends downwardly into the tank, container or reservoir 10, as best shown in FIGURE 1, and a screen 34 is fitted across its open end (FIGURE 3). This tube 32, with its holder 30, slides in a cylindrical support 36 mounted on a base 38 on the top of the tank or reservoir 10, and a circular rim 40 is at the top of the cylinder 36 (FIGURE 2). Set screws 42 are in the annulus 30 of the holder or tube 32, whereby the relationship between the holder tube 32, and the cylindrical support 36 may be adjusted with considerable accuracy.

The tube 24 which holds the briquettes 28 is sealed at its lower end with a water soluble, plastic film, such as a polyvinyl alcohol 44, which film rests upon the screen 34 when the tube is dropped into the holder 30—32, and the tube 24 is, itself, disposable and replaceable when the supply of briquettes within the same is exhausted.

When the film 44 is dissolved, the lowermost briquette 28 will be exposed to the dissolving action of the water 20; and, because of the adjustable controls which include the valve 14 and the set screws 42, the rate of feeding and dissolving of the briquettes can be preliminarily regulated so that one tube 24, full of various briquettes in a pre-determined order, will provide sufficient chemicals for any desired length of time, for example, approximately one month.

Figure 6:
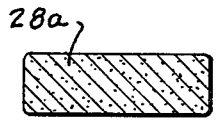
FIGURE 6 is an elevation of one type of briquette used in conjunction with the water treatment apparatus of this invention.
Figure 7:
FIGURE 7 illustrates a briquette of a different or variable composition from that shown in FIGURE 6.

Referring now to FIGURES 6 to 9, inclusive, it will be noted that the briquette 28a of FIGURE 6 can be of some regular composition, such as polyphosphate, which is essential in such water treatment. The briquette 28b of FIGURE 7 can be of a variable composition which might include a granular anhydrous polyphosphate, a water soluble tannin extract and a metal lignin sulfonate wetting agent. Such a combination provides the necessary and usual polyphosphate, and the tannin material acts with the polyphosphate to retard its reversion rate, and this compound may then be used as a buffer or spacer between acid-type briquettes and chlorine-bearing briquettes since it is well known that acids interfere to a certain extent with the algaecide activity of chlorine compounds.

Figure 8:
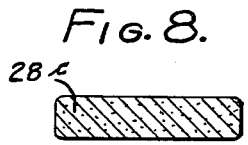
FIGURE 8 shows a briquette of smaller size, whereby a lesser quantity of a particular chemical is fed into the system as required or desirable.

In FIGURE 8, a smaller size briquette 28c is shown, which can be inserted in some regular or pre-determined order in the tube 24 by the manufacturer. Such a briquette may comprise benzalkonium chloride in power form and an non-ionic surfactant such as a polyoxyethylene oxide, the combination of which forms into firm briquettes and further acts as an effective algaecide with no perceptible odor.

Figure 9:
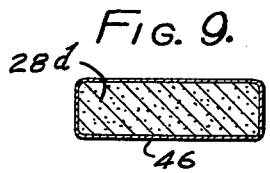
FIGURE 9 illustrates a further type of briquette which has a soluble outer film or coating.

With regard to FIGURE 9, a briquette 28d is shown, which includes a soluble outer film 46, which excludes the air. Such a briquette can be composed of barium hydroxide together with an octyldecyl amine and a water soluble tannin extract. It is well known that barium hydroxide will extract carbon dioxide from the air to form insoluble barium carbonates. By forming this into briquettes, only the outside surface is exposed to the air so that approximately ninety percent of the barium hydroxide remains in that form. Further, the water soluble film will assist to exclude air. Introduced into boiler feed water, the barium hydroxide will form precipitates of carbonates and sulfates, thus reducing the scale-forming components of boiler feed water.

The fact that quite a number of briquettes can be placed in the tube 24 enables the use of three different dry acids together with acidic binders. The acids may be granular amido sulfonic acid, an hydroxylic acid, such as citric acid and a carboxylic acid, such as formic acid, together with a binder such as zein. This combination is an impovement over inhibited sulfamic acid or hydrochloric acid as its activity is both acidic and solubilizes iron oxides. This combination further controls pH and does not corrode iron or steel.

Figure 4:
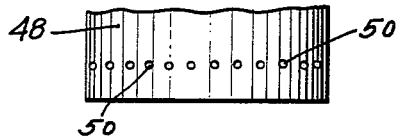
FIGURE 4 illustrates a slightly modified form of the lower end of the feed tube of this invention.
Figure 5:
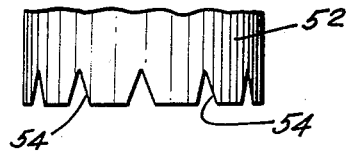
FIGURE 5 illustrates another modification.

In FIGURE 4, a modified form of the tube holder is shown, which comprises a cylinder 48, having a series of openings 50, whereby entry of water into the briquettes in the tube 24 is facilitated; and, in FIGURE 5, the lower end of the tube 52 notched, as at 54, to provide openings for ingress of water.

The fact that the briquettes 28, which can include various chemicals, such as amido sulfonic acid, chromates, organic sequestrants, polyphosphates such as tetra-sodium-pyrophosphate, can be arranged by stacking them in a disposable tube which is then placed in the feeder, and whereby the lowest briquette which will be intermittently immersed in water will be dissolved at a rate proportional to the quantity of water, provides a novel and useful feature in this art. As the lowest briquette becomes dissolved, the one immediately above it will automatically drop, allowing the process to continue.

Thereby, the water employed, regardless of its mineral content which obviously varies from place to place and from season to season, will be automatically conditioned in accord with accepted practices by accumulative effect of selected chemicals in proper sequence. Therefore, the user need actually known nothing about the art of water treating. His sole responsibility will be to discard the tube 24 when it is empty and replace it will a new and filled one.

The fact that the disposable tube 28 is closed at one end with a water soluble, plastic film permits the user to inert such a tube into the mechanism without the necessity of removing such a closure. If a nonsoluble cap were on the tube, the briquettes would obviously, and very possibly, fall out of the tube and would be broken, and any replacement would be difficult and would also permit possible improper sequential arrangement.

It will be evident that herein is provided a water treatment apparatus which will greatly reduce maintenance expense on boilers, cooling towers, evaporative condensers and similar equipment, because the briquettes are formed under considerable pressure, whereby they dissolve quite slowly, and the controls on the feeder permit narrow limits of feed water flow, and the disposable tube can be of such a size that it will contain sufficient chemicals for periods of at least thirty days without any attention whatsoever in the interim.

I am aware that many changes may be made and numerous details of construction varied throughout a wide range without departing from the principles of this invention; and I, therefore, do not propose limiting the patent granted hereon otherwise than as necessitated by the prior art.

I claim as my invention:

1. In water treatment apparatus, the combination of: a reservoir for water; an inlet conduit for supplying a constant flow of water to said reservoir; an outlet conduit larger in capacity than said inlet conduit and including a siphon section adapted to be primed upon filling of said reservoir to a predetermined water level to drain said reservoir to a lower water level; a holder mounted above said reservoir; an elongated, substantially vertically oriented tube supported by said holder for vertical movement and adapted to slidably support a plurality of stacked briquettes of water treatment material; and means for adjusting the height of said tube to dispose the lower end thereof in said reservoir between said predetermined water level and said lower water level whereby the briquette material in the lower end of said tube is automatically intermittently immersed within the water in said reservoir.

2. In water treatment apparatus, the combination of: a reservoir for water; an inlet conduit for supplying a constant flow of water to said reservoir; valve means in said inlet conduit for regulating the rate of water flow therethrough; an outlet conduit larger in capacity than said inlet conduit and including a siphon section adapted to be primed upon filling of said reservoir to a predetermined water level to drain said reservoir to a lower water level; a holder mounted above said reservoir; an elongated, substantially vertically oriented tube supported by said holder for vertical movement and adapted to slidably support a plurality of stacked briquettes of water treatment material; and means for adjusting the height of said tube to dispose the lower end thereof in said reservoir between said predetermined water level and said lower water level whereby the briquette material in the lower end of said tube is automatically intermittently immersed within the water in said reservoir.

3. In water treatment apparatus, the combination of: a reservoir for water; an inlet conduit for supplying a constant flow of water to said reservoir; an outlet conduit larger in capacity than said inlet conduit and including a siphon section adapted to be primed upon filling of said reservoir to a predetermined water level to drain said reservoir to a lower water level; a holder mounted above said reservoir; an elongated, substantially vertically oriented tube supported by said holder for vertical movement and adapted to slidably support a plurality of stacked briquettes of water treatment material; a water soluble film across the lower end of said tube whereby the briquettes are retained in said tube upon insertion thereof within said holder, said film being dissolvable upon immersion in the water in said reservoir; and means for adjusting the height of said tube to dispose the lower end thereof in said reservoir between said predetermined water level and said lower water level whereby the briquette material in the lower end of said tube is automatically intermittently immersed within the water in said reservoir.

4. In water treatment apparatus, the combination of: a reservoir for water; an inlet conduit for supplying a constant flow of water to said reservoir; an outlet conduit larger in capacity than said inlet conduit and including a siphon section adapted to be primed upon filling of said reservoir to a predetermined water level to drain said reservoir to a lower water level; a support secured above said reservoir in fixed relationship therewith; an elongated, hollow holder slidably mounted in a substantially vertical position by said support; an apertured element disposed across the lower extremity of said holder; an elongated, substantially vertically oriented tube disposed within said holder upon said apertured element, and adapted to slidably support a plurality of stacked briquettes of water treatment material; and means operative upon said support and said holder for moving said holder relative to said support to thereby adjust the height of said tube to dispose the lower end thereof in said reservoir between said predetermined water level and said lower water level whereby the briquette material in the lower end of said tube is automatically intermittently immersed within the water in said reservoir.

5. In water treatment apparatus, the combination of: a reservoir for water; an inlet conduit for supplying a constant flow of water to said reservoir; an outlet conduit larger in capacity than said inlet conduit and including a siphon section adapted to be primed upon filling of said reservoir to a predetermined water level to drain said reservoir to a lower water level; a support secured above said reservoir in fixed relationship therewith; an elongated hollow holder slidably mounted in a substantially vertical position by said support; an apertured element disposed across the lower extremity of said holder; an elongated, substantially vertically oriented tube disposed within said holder upon said apertured element, and adapted to slidably support a plurality of stacked briquettes of water treatment material; a water soluble film across the lower end of said tube whereby the briquettes are retained in said tube upon insertion thereof within said holder, said film being dissolvable upon immersion in the water in said reservoir; and means operative upon said support and said holder for moving said holder relative to said support to thereby adjust the height of said tube to dispose the lower end thereof in said reservoir between said predetermined water level and said lower water level whereby the briquette material in the lower end of said tube is automatically intermittently immersed within the water in said reservoir.

6. In water treatment apparatus, the combination of: a reservoir for water; an inlet conduit for supplying a constant flow of water to said reservoir; an outlet conduit larger in capacity than said inlet conduit and including a siphon section adapted to be primed upon filling of said reservoir to a predetermined water level to drain said reservoir to a lower water level; a holder mounted above said reservoir; an elongated, substantially vertically oriented tube supported by said holder for vertical movement; a plurality of stacked briquettes of water treatment material slidably disposed within said tube, said briquettes including acid-type briquettes, chlorine-bearing briquettes, and buffer briquettes including polyphosphate and tannin extract, said buffer briquettes being disposed between adjacent ones of said acid-type and chlorine-bearing briquettes to prevent chemical interaction therebetween; and means for adjusting the height of said tube to dispose the lower end thereof in said reservoir between said predetermined water level and said lower water level whereby the briquette material in the lower end of said tube is automatically intermittently immersed within the water in said reservoir.

References Cited in the file of this patent
UNITED STATES PATENTS

| | | |
|---|---|---|
| 2,412,106 | Swartz | Dec. 3, 1946 |
| 2,471,158 | Livingstone | May 24, 1949 |
| 2,546,317 | Prezer | Mar. 27, 1951 |
| 2,761,562 | Moody | Sept. 4, 1956 |
| 2,841,572 | McMahon | July 1, 1958 |
| 2,880,076 | Kircher et al. | Mar. 31, 1959 |